(12) United States Patent
Harada et al.

(10) Patent No.: US 9,718,435 B2
(45) Date of Patent: Aug. 1, 2017

(54) BUCKLE DEVICE

(71) Applicant: KABUSHIKI KAISHA TOKAI-RIKA-DENKI-SEISAKUSHO, Aichi-ken (JP)

(72) Inventors: Shuji Harada, Aichi-ken (JP); Yasunori Hattori, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/003,141

(22) Filed: Jan. 21, 2016

(65) Prior Publication Data
US 2016/0214568 A1 Jul. 28, 2016

(30) Foreign Application Priority Data

Jan. 26, 2015 (JP) .................. 2015-012446

(51) Int. Cl.
*B60R 22/18* (2006.01)
*A44B 11/25* (2006.01)

(52) U.S. Cl.
CPC .......... *B60R 22/18* (2013.01); *A44B 11/2546* (2013.01); *A44B 11/2507* (2013.01); *B60R 2022/1806* (2013.01)

(58) Field of Classification Search
CPC ............ B60R 22/18; B60R 2022/1806; A44B 11/2546; A44B 11/2507
See application file for complete search history.

(56) References Cited

U.S. PATENT DOCUMENTS

| | | | | |
|---|---|---|---|---|
| 4,919,484 A | * | 4/1990 | Bougher | B60R 22/02 280/801.1 |
| 9,145,105 B2 | * | 9/2015 | Ohmura | B60N 2/646 |
| 9,283,913 B2 | * | 3/2016 | Johnson | B60R 21/18 |
| 2007/0013184 A1 | * | 1/2007 | Gomi | B60R 22/18 280/801.1 |
| 2013/0037674 A1 | * | 2/2013 | Mitsuo | B60R 22/26 248/309.1 |
| 2016/0214567 A1 | * | 7/2016 | Harada | B60R 22/18 |

FOREIGN PATENT DOCUMENTS

JP 2013-35465 2/2013

\* cited by examiner

*Primary Examiner* — Faye M Fleming
(74) *Attorney, Agent, or Firm* — Roberts Mlotkowski Safran Cole & Calderon P.C.

(57) ABSTRACT

A buckle device includes a buckle body that retains a tongue through which a webbing worn across an occupant is inserted; a fixing plate that is fixed to a vehicle seat and that includes a coupling webbing insertion hole; and a coupling webbing that is formed in a belt shape and that couples the buckle body and the fixing plate together. The buckle device further includes a boot that covers the coupling webbing. Moreover, the boot is provided with an engagement protrusion portion that engages with the coupling webbing insertion hole so as to suppress rattling of the boot against the fixing plate.

7 Claims, 14 Drawing Sheets

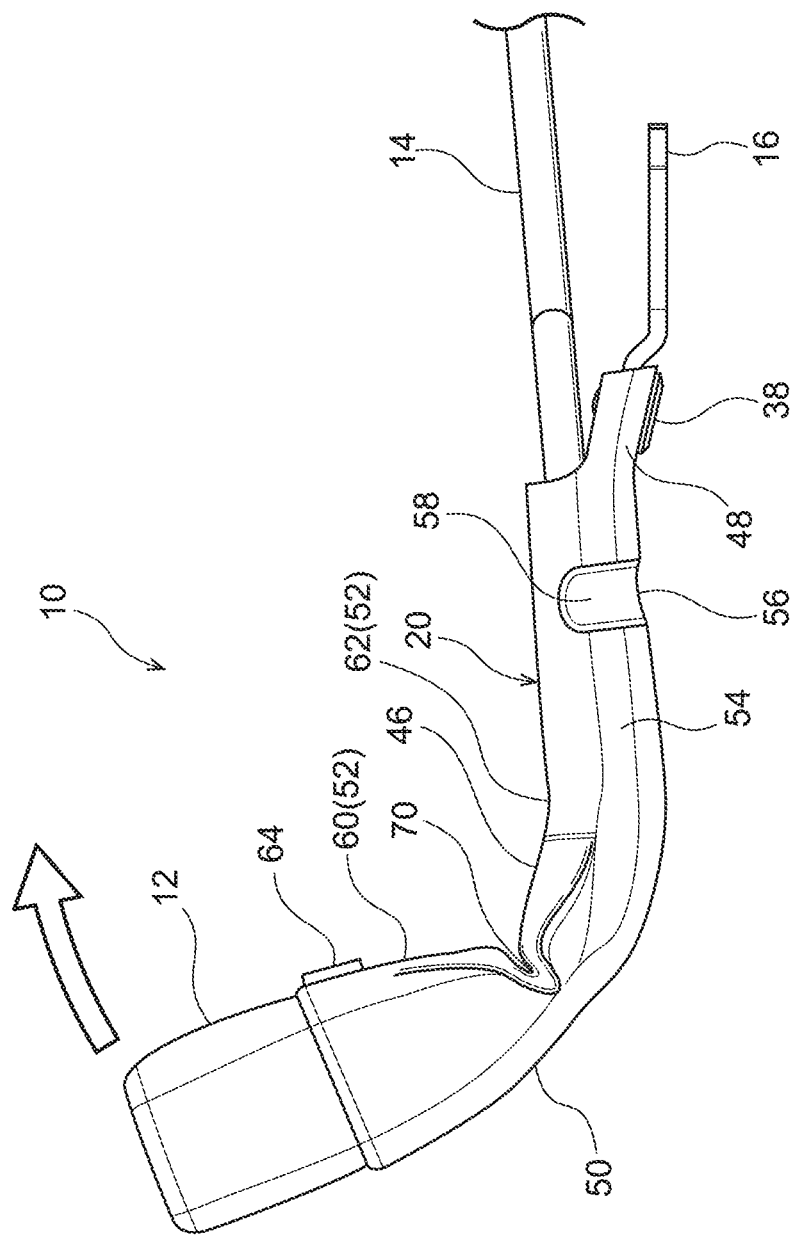

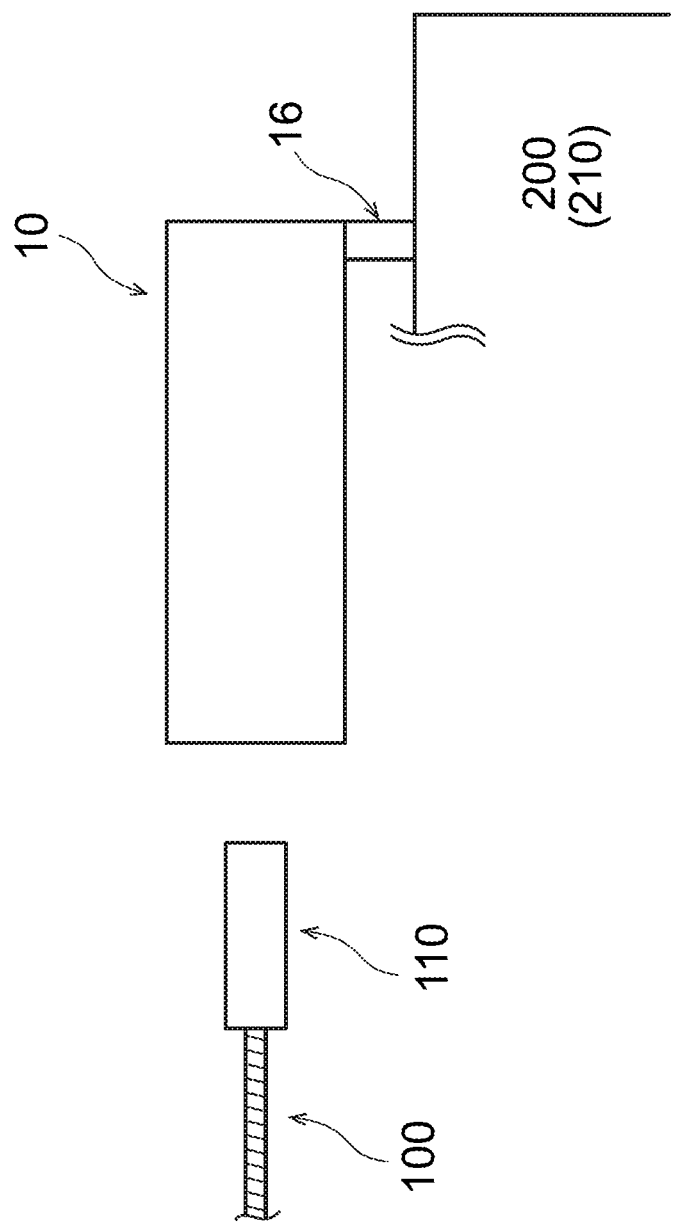

BUCKLE DEVICE

CROSS-REFERENCE TO RELATED APPLICATION

This application claims priority under 35 USC 119 from Japanese Patent Application No. 2015-012446 filed Jan. 26, 2015, the disclosure of which is incorporated by reference herein.

BACKGROUND

Field of the Invention
The present invention relates to a buckle device.
Related Art
Japanese Patent Application Laid-Open (JP-A) No. 2013-35465 discloses a buckle device (buckle support device for automobile) including a buckle body (buckle device) that retains a tongue through which webbing worn across an occupant is inserted. The buckle device described in JP-A No. 2013-35465 includes the buckle body, a fixing portion (anchor plate) that is fixed to a vehicle seat, a coupling member (inner webbing) that connects the buckle body and the fixing portion together, and a boot (inner boot) that is formed in a tube shape, covering the coupling member.

A fixing portion side end portion of the boot is fixed to the fixing portion via an inside tape. Rattling of the boot against the fixing portion is accordingly suppressed.

However, in the buckle device described in JP-A No. 2013-35465, it is necessary to wind the inside tape around the fixing portion side end portion of the boot, increasing number of assembly processes of the buckle device.

SUMMARY

In consideration of the above circumstances, a buckle device is obtained that is capable of suppressing rattling of the boot against the fixing portion without increasing number of assembly processes.

A buckle device of a first aspect includes: a buckle body that retains a tongue through which a webbing worn across an occupant is inserted; a fixing portion that is fixed to a vehicle seat or a vehicle body and that includes an engaged-with portion; a coupling member that is formed in a belt shape and that couples the buckle body and the fixing portion; and a boot that covers the coupling member, and that includes an engagement portion that engages with the engaged-with portion so as to suppress rattling of the boot with respect to the fixing portion.

A buckle device of a second aspect is the buckle device of the first aspect, wherein the engaged-with portion is configured as a coupling member insertion hole through which the coupling member is inserted.

In the second aspect, it is possible that the engagement portion is a protruding portion protrudes toward an inside of the boot, and the protruding portion and the coupling member are fitted in the coupling member insertion hole in a state in which the protruding portion and the coupling member are contacted.

A buckle device of a third aspect is the buckle device of either the first aspect or the second aspect, wherein the boot comprises a tube portion formed in a tube shape that covers the coupling member, and an extension portion that extends from an open end of the tube portion; and at least a part of the engagement portion is provided at the extension portion.

In the buckle device of the first aspect, the fixing portion is fixed to the vehicle seat or the vehicle body, thereby fixing the buckle device to the vehicle seat or the vehicle body. The tongue through which the webbing is inserted is retained by the buckle body, such that the webbing is worn across the occupant. In the present aspect, the engagement portion provided at the boot is made to engage with the engaged-with portion provided at the fixing portion, thereby enabling rattling of the boot against the fixing portion to be suppressed. In this configuration, a process such as tape winding in order to suppress rattling of the boot against the fixing portion is not needed. Namely, the buckle device of the present aspect enables rattling of the boot against the fixing portion to be suppressed without increasing number of assembly processes.

In the buckle device of the second aspect, the coupling member insertion hole through which the coupling member is inserted functions as the engaged-with portion with which the engagement portion provided at the boot engages. This thereby enables the configuration of the fixing portion to be simplified in comparison to a case in which a coupling member insertion hole and an engaged-with portion that only engages with the engagement portion of the boot are respectively provided at the fixing portion.

In the buckle device of the third aspect, at least a part of the engagement portion is provided at the extension portion that extends out toward the outside of the tube portion. This thereby enables good mold-release characteristics of the boot from the mold after pouring resin material, rubber material, or the like inside the mold and forming the boot.

BRIEF DESCRIPTION OF THE DRAWINGS

Exemplary embodiment will be described in detail with reference to the following figures, wherein:

FIG. 11 is a side view schematically illustrating a state in which a boot has bent due to a buckle body moving toward a width direction outside of a vehicle seat;

FIG. 13 is a simple view illustrating a buckle device.

DETAILED DESCRIPTION

Explanation follows regarding a buckle device according to an exemplary embodiment, with reference to FIG. 1 to FIG. 10F.

Figure 1:
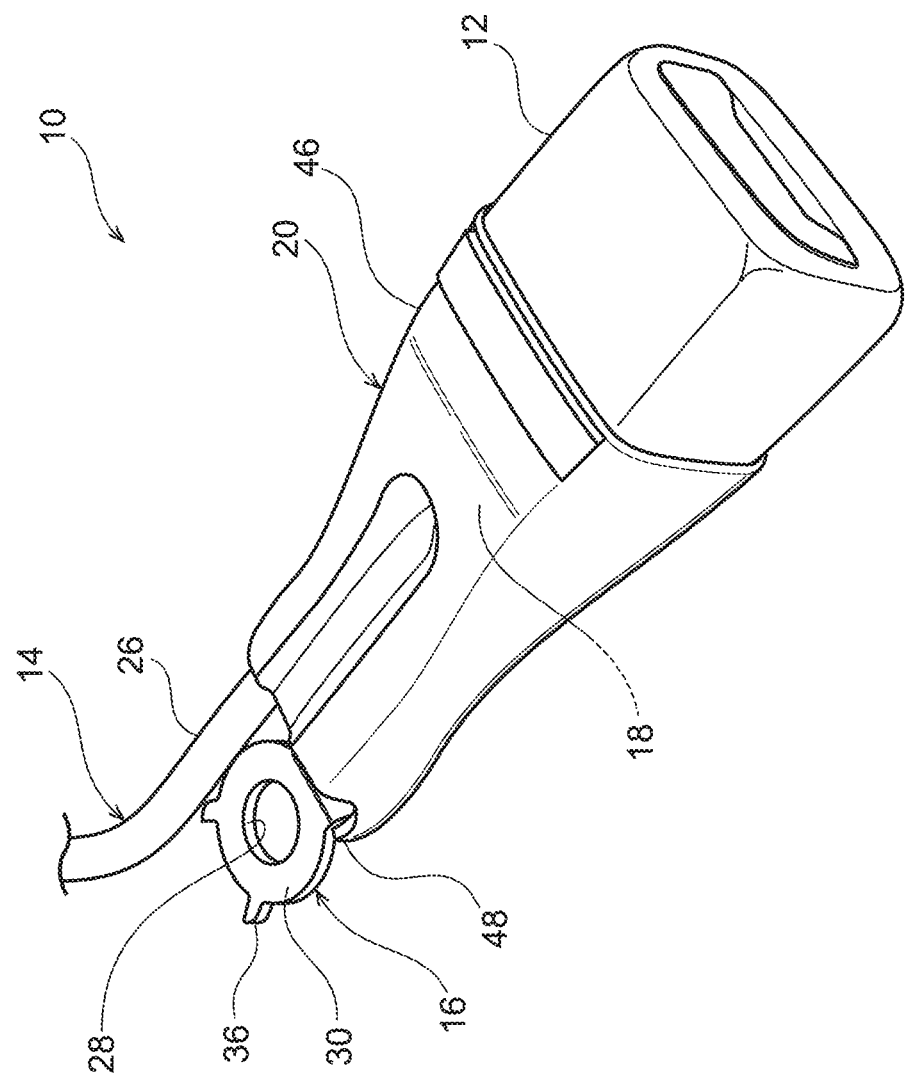
FIG. 1 is a perspective view illustrating a buckle device of an exemplary embodiment, as viewed from a buckle body side.
Figure 2:
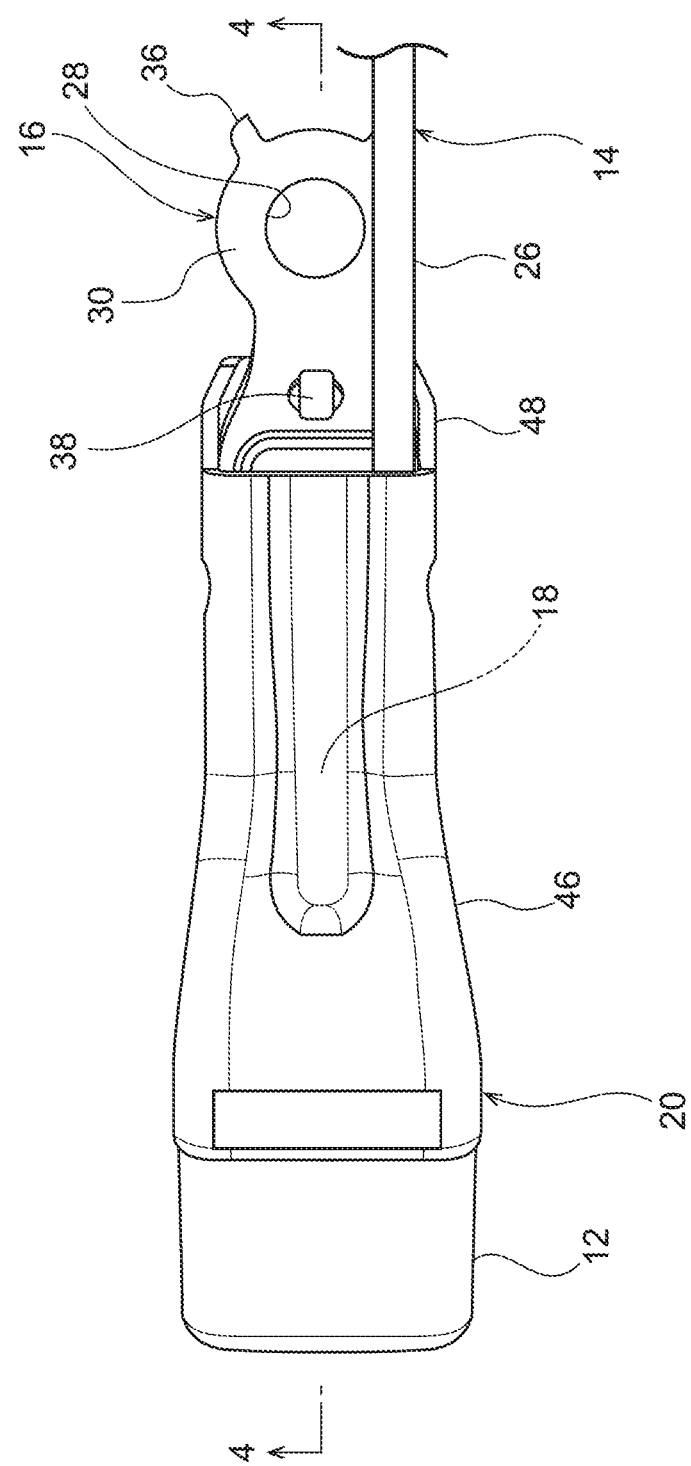
FIG. 2 is a plan view illustrating a buckle device.
Figure 3:
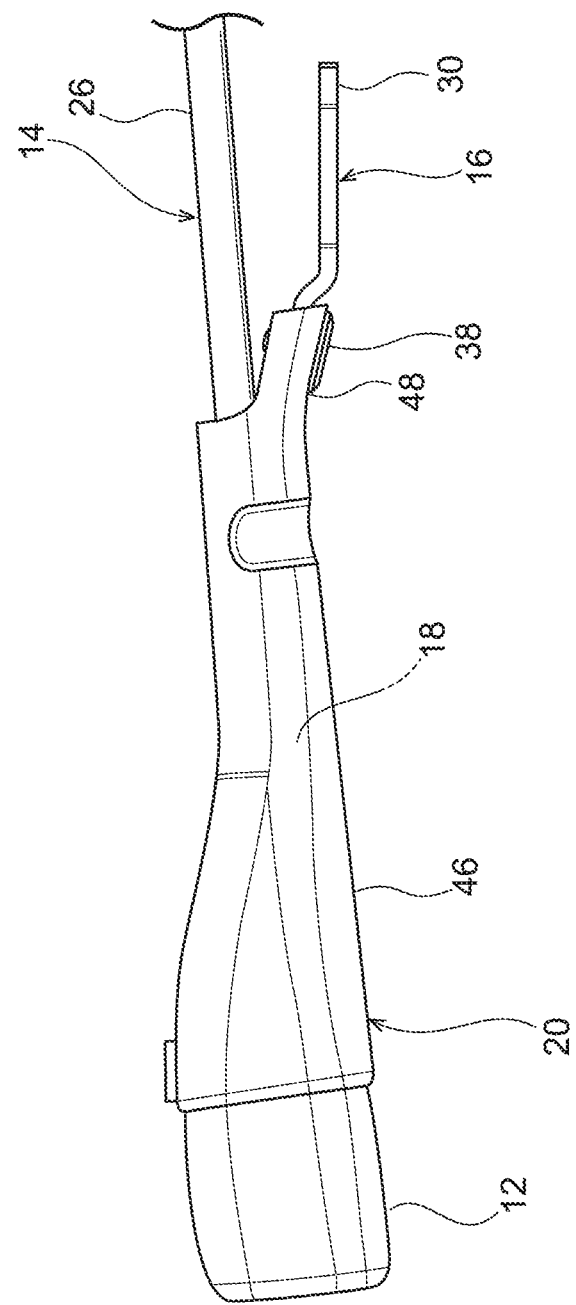
FIG. 3 is a side view illustrating a buckle device.
Figure 4:
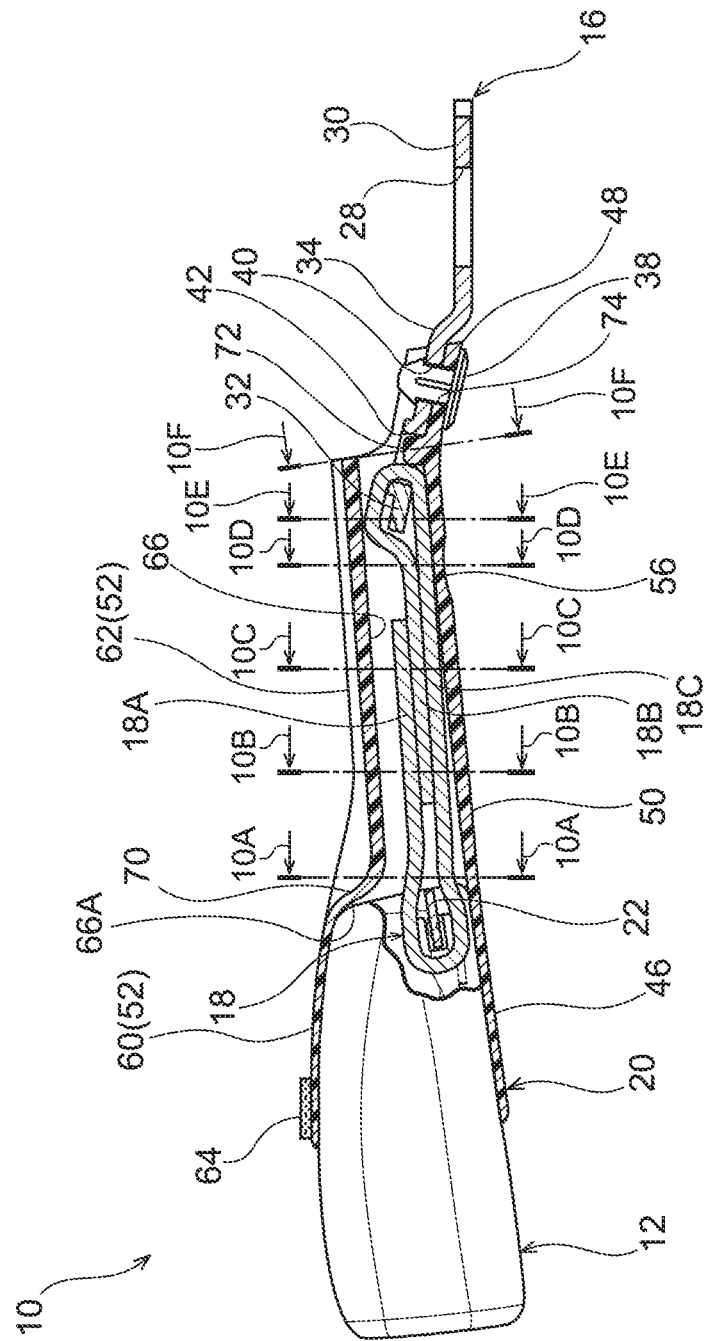
FIG. 4 is a cross-section illustrating a buckle device sectioned along line 4-4 in FIG. 2.
Figure 5:
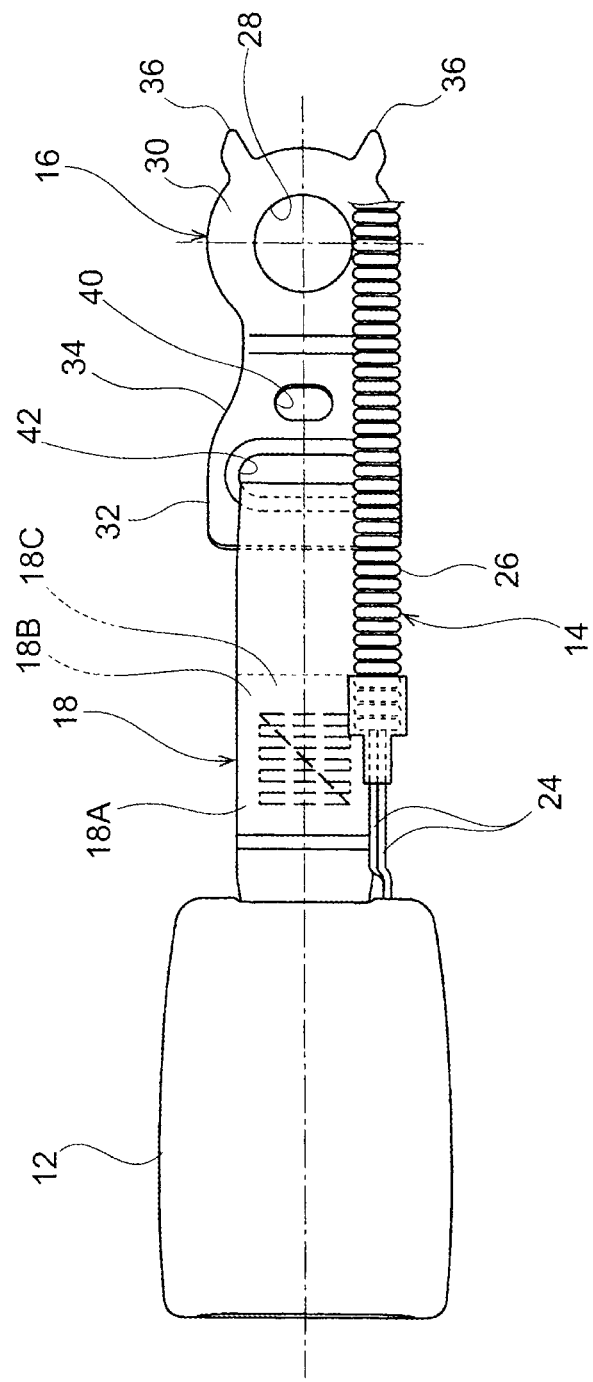
FIG. 5 is a plan view illustrating a state in which a buckle body, to which a wire harness is connected, and a fixing plate are connected together by a coupling webbing.

As illustrated in FIG. 1 to FIG. 3, a buckle device 10 of the present exemplary embodiment is disposed at a lateral side of a vehicle seat, not shown in the drawings, and is fixed to a seat cushion frame 200 configuring part of the vehicle seat. The buckle device 10 includes a buckle body 12 that retains a tongue 110 through which a webbing 100 that is worn across an occupant sitting in the vehicle seat is inserted, a wire harness 14 that is connected to the buckle body 12, and a fixing plate 16, serving as a fixing portion, that is fixed to the seat cushion frame 200. As illustrated in FIG. 4 and FIG. 5, the buckle device 10 further includes a coupling webbing 18, serving as a coupling member that is formed in a belt (strap) shape and that couples the buckle body 12 and the fixing plate 16 together, and a boot 20 that covers the coupling webbing 18 in a state in which part of the wire harness 14 is disposed inside the boot 20.

The buckle body 12 is formed in a rectangular block shape, and a retention mechanism that retains the tongue 110 and a release mechanism that releases retention of the tongue 110 by the retention mechanism, not shown in the drawings, are provided inside the buckle body 12. As illustrated in FIG. 4, an end portion on the fixing plate 16 side of the buckle body 12 is provided with an anchor portion 22 to which one end portion of the coupling webbing 18, described in detail later, is anchored.

As illustrated in FIG. 5, the wire harness 14 is configured by plural wiring cords 24 connected to a switch employed to detect, for example, whether or not the buckle body 12 is retaining the tongue 110, being housed inside a flexible wiring tube 26. In the present exemplary embodiment, the wire harness 14 extends along an end of the coupling webbing 18, which is at one side in a short length direction of the coupling webbing 18, in plan view.

Figure 6:
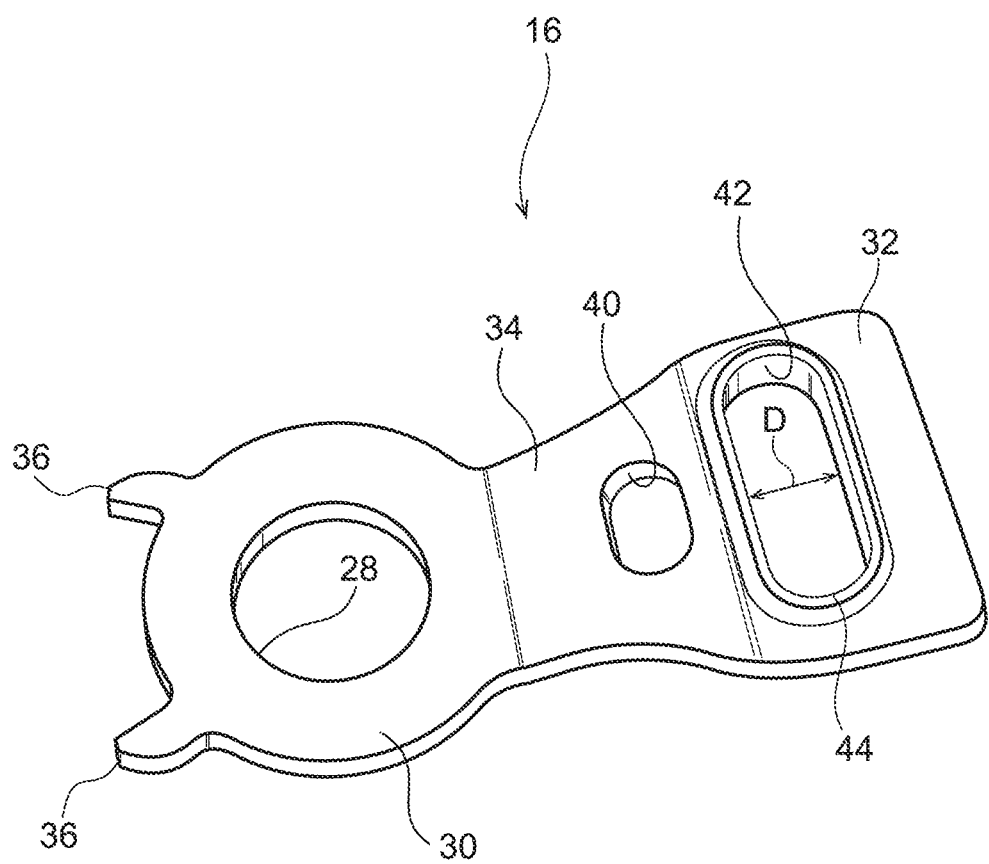
FIG. 6 is a perspective view illustrating a fixing plate.

As illustrated in FIG. 6, the fixing plate 16 is formed by, for example, pressing a steel plate member. The fixing plate 16 includes a circular disk portion 30 which includes a circular shaped opening 28 at a central portion thereof and is formed in a circular disk shape, and which is fixed to the seat cushion frame 200 using a fastening member, not shown in the drawings, a coupling webbing anchor portion 32 to which an end portion of the coupling webbing 18, which is at another side in long length direction of the coupling webbing 18 (see FIG. 5), is anchored, and an inclined connection portion 34 that joins the circular disk portion 30 and the coupling webbing anchor portion 32 together.

The circular disk portion 30 is provided with two projections 36 that project out toward the radial direction outside of the circular disk portion 30. The projections 36 abut an abutted portion provided at the seat cushion frame 200 so as to restrict rotation of the circular disk portion 30 about the fastening member. The buckle device 10 (see for example FIG. 1) is thereby fixed to the seat cushion frame 200 in a specific orientation.

The inclined connection portion 34 is inclined from the circular disk portion 30 toward the coupling webbing anchor portion 32 side. The circular disk portion 30 and the coupling webbing anchor portion 32 are accordingly disposed offset to each other in their respective thickness directions. The inclined connection portion 34 is formed with a clip anchor hole 40 to which a clip 38, described later (see FIG. 4) is anchored.

The coupling webbing anchor portion 32 is formed with a coupling webbing insertion hole 42 that is formed in an elongated hole shape, and that serves as an engaged-with portion and a coupling member insertion hole. An internal diameter D in the short length direction of the coupling webbing insertion hole 42 is set as an internal diameter several times greater than the thickness of the coupling webbing 18 (see FIG. 5). Accordingly, as illustrated in FIG. 4, an engagement protrusion portion 72 provided at the boot 20, described later, can engage between the coupling webbing 18 that is inserted through the coupling webbing insertion hole 42, and an inner edge portion of the coupling webbing insertion hole 42. Note that at a peripheral edge portion of the coupling webbing insertion hole 42, a flange 44 is formed that projects out toward one thickness direction side of the coupling webbing anchor portion 32.

As illustrated in FIG. 4 and FIG. 5, the coupling webbing 18 is formed using a similar material to that of the webbing worn across the occupant sitting in the vehicle seat. As illustrated in FIG. 4, one side in long length direction of the coupling webbing 18 is folded over in a U-shape in a state in which it is anchored to the anchor portion 22 of the buckle body 12, and another side in the long length direction of the coupling webbing 18 is folded over in a U-shape in a state in which it is inserted through the coupling webbing insertion hole 42 of the fixing plate 16. An end portion 18A at the one side in the long length direction of the coupling webbing 18, an end portion 18B at the another side in the long length direction of the coupling webbing 18, and an intermediate portion 18C in the long length direction of the coupling webbing 18 are joined together by sewing or stitching in an overlapping state.

Figure 7:
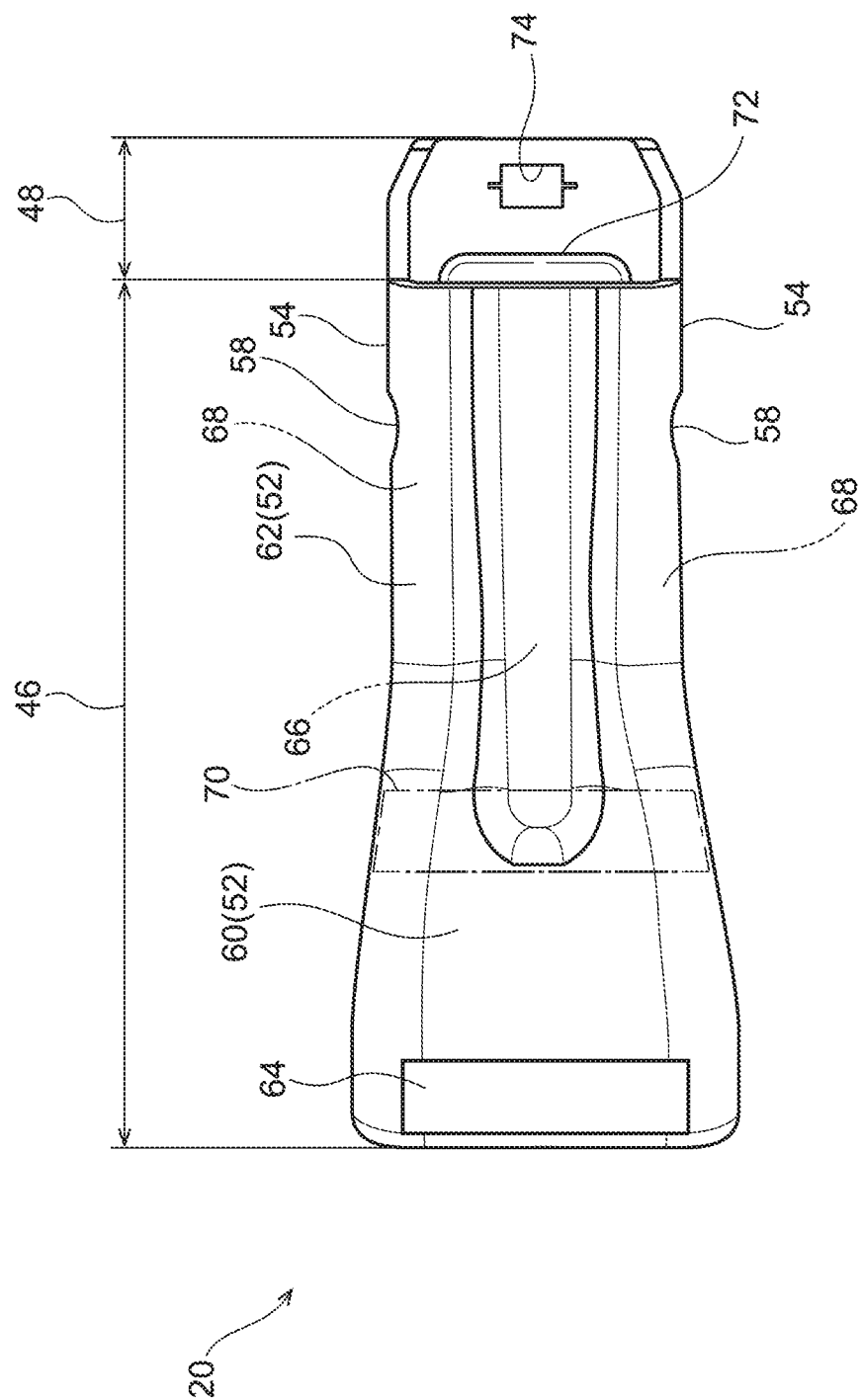
FIG. 7 is a plan view illustrating a boot.
Figure 8:
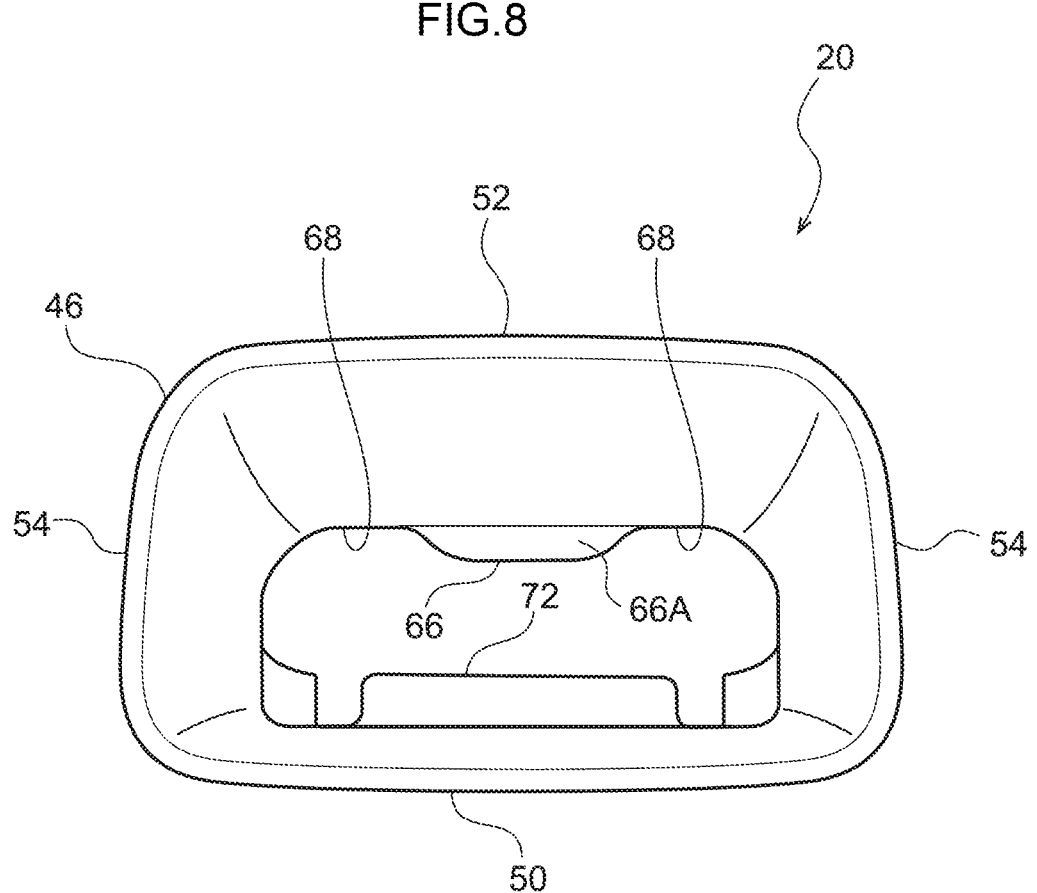
FIG. 8 is a front view illustrating a boot from one long length direction side.
Figure 9:
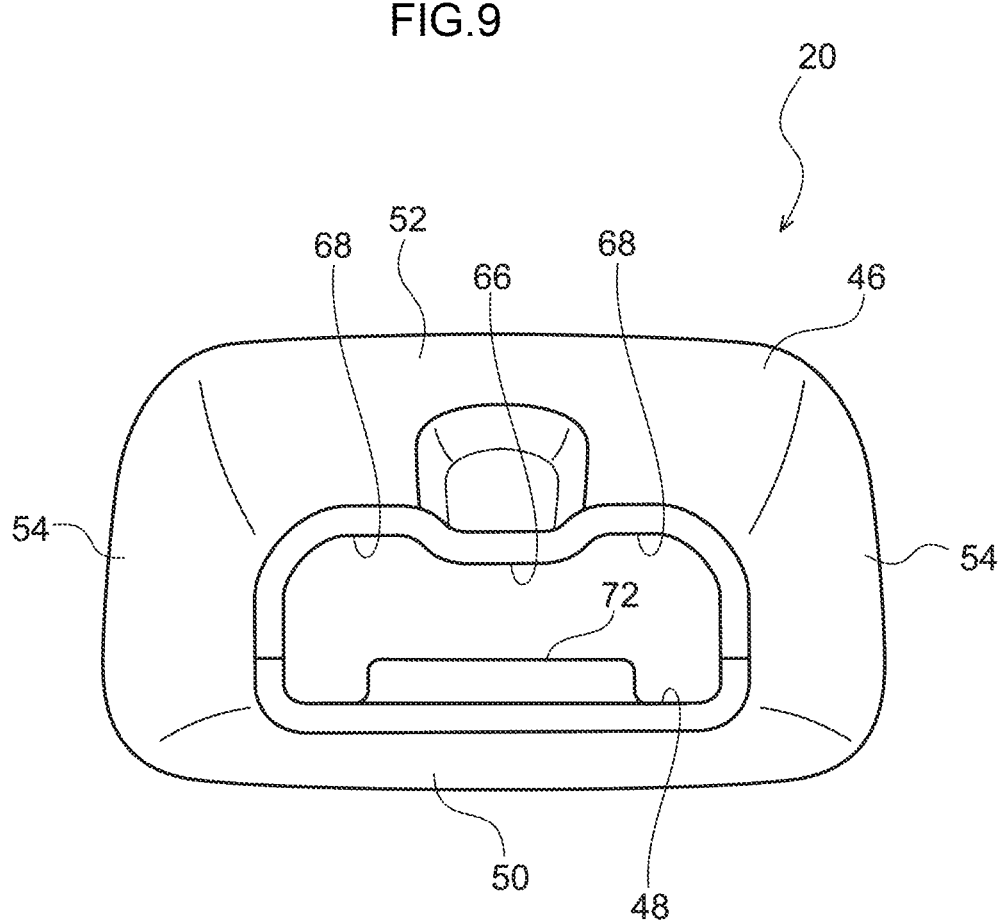
FIG. 9 is a back view illustrating a boot from another long length direction side.
Figure 10A:
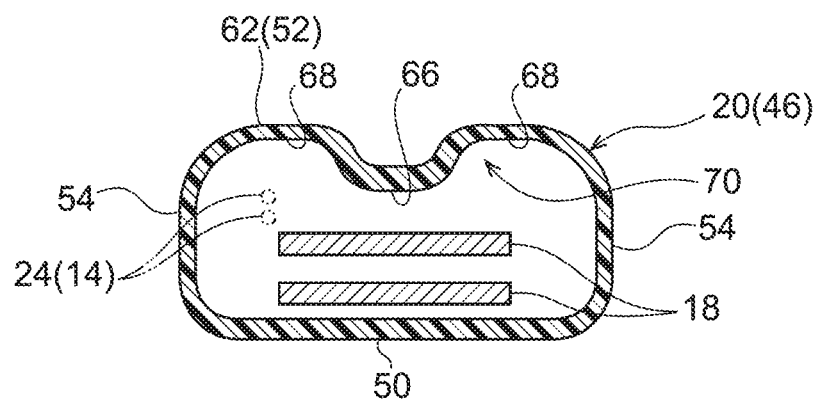
FIG. 10A is a cross-section illustrating a buckle device sectioned along line 10A-10A in FIG. 4.
Figure 10B:
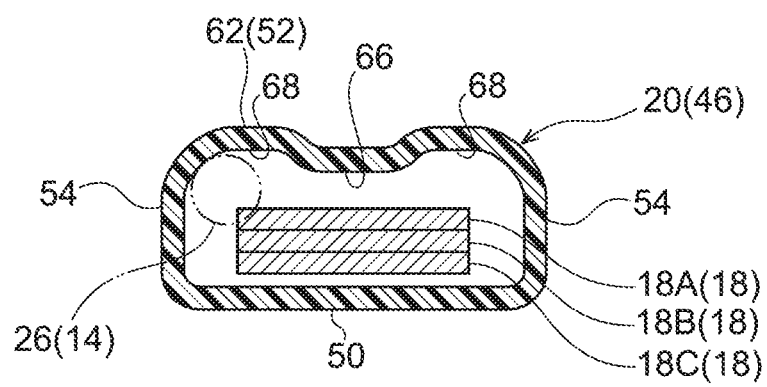
FIG. 10B is a cross-section illustrating a buckle device sectioned along line 10B-10B in FIG. 4.
Figure 10C:
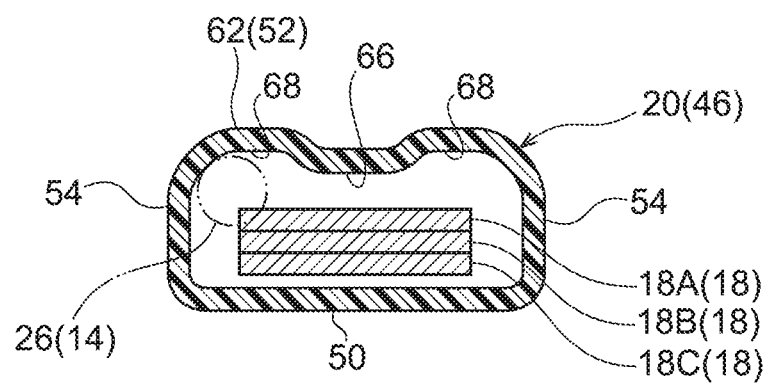
FIG. 10C is a cross-section illustrating a buckle device sectioned along line 10C-10C in FIG. 4.
Figure 10D:
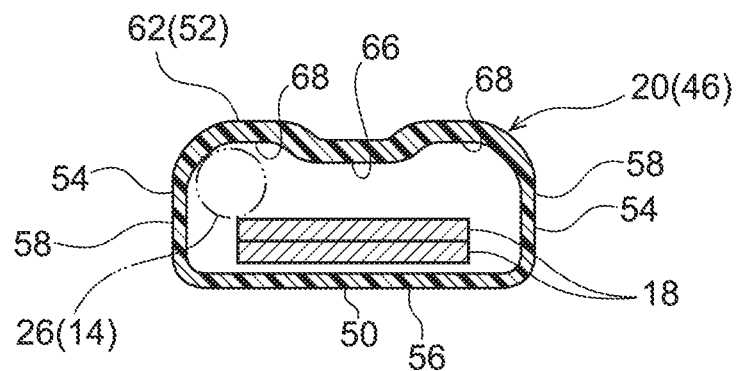
FIG. 10D is a cross-section illustrating a buckle device sectioned along line 10D-10D in FIG. 4.
Figure 10E:
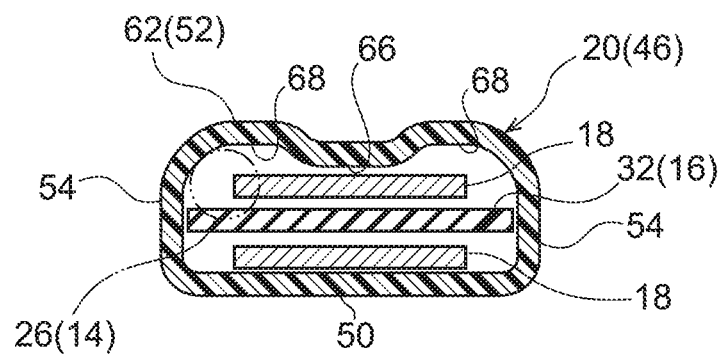
FIG. 10E is a cross-section illustrating a buckle device sectioned along line 10E-10E in FIG. 4.
Figure 10F:
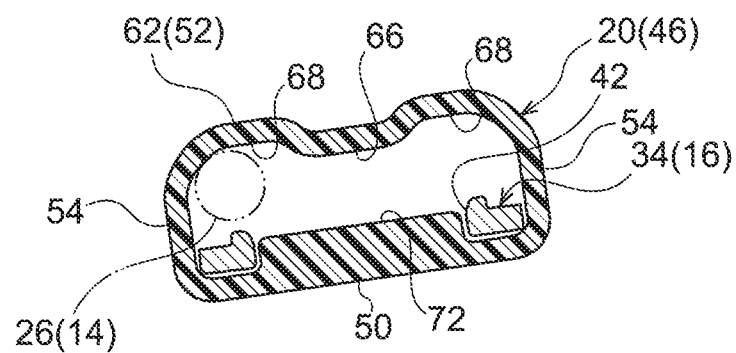
FIG. 10F is a cross-section illustrating a buckle device sectioned along line 10E-10F in FIG. 4.

The boot 20 covers the coupling webbing 18 in a state in which part of the wire harness 14 (see FIG. 5) is disposed inside the boot 20. The boot 20 is formed by pouring a resin material, a rubber material, or the like into a mold, and being cooled, thereafter being mold-released (demolded) from the mold. Specifically, as illustrated in FIG. 7 to FIG. 9, the boot 20 is configured including a tube shaped portion 46 that is formed in a tube shape and covers the coupling webbing 18, and an extension portion 48 that extends out from an end of the tube shaped portion 46.

The tube shaped portion 46 includes an inner wall 50 (see FIG. 8) disposed on the side of the vehicle seat (seat cushion), an outer wall 52 that is disposed on the side away from the vehicle seat with respect to the inner wall 50, and that is disposed facing the inner wall 50, and a pair of side walls 54 that join both (two) ends in short length direction of the inner wall 50 to both (two) ends in the short direction of the outer wall 52. The tube shaped portion 46 is accordingly formed in a rectangular tube shape as viewed along its long length direction.

As illustrated in FIG. 4, the inner wall 50 is formed in a rectangular plate shape extending along the buckle body 12 and the coupling webbing 18. Moreover, an end portion on the fixing plate 16 side of the inner wall 50 is formed with a depression (dent portion) 56, serving as a second bend origin portion, that acts as an origin portion of bending when the buckle body 12 is moved toward the vehicle seat side (when the buckle body 12 is moved toward another side in the thickness direction of the coupling webbing 18). The thickness of a location of the inner wall 50, that faces the buckle body 12, is set thinner than the thickness of a location of the inner wall 50, that faces the coupling webbing 18 (except for at the location formed with the depression 56). Note that as illustrated in FIG. 7, in the present exemplary embodiment, locations on the pair of side walls 54 corresponding to the location formed with the depression 56 are formed with depressions (dent portions) 58 of similar configuration to the depression 56.

As illustrated in FIG. 4, the outer wall 52 includes a first extension portion 60 which is disposed facing the buckle body 12, and a second extension portion 62 which is disposed facing the coupling webbing 18. At an end portion of the first extension portion 60 on the side away from the fixing plate 16, a felt 64 that is formed in a sheet shape is joined. As illustrated in FIG. 4 and FIG. 7, at an intermediate portion of the second extension portion 62 in the width direction (short length direction) of the coupling webbing 18, a projection (convex) shaped portion 66 that is configured in a projecting shape projecting toward the coupling webbing 18 side, and that serves as a restriction portion. The projection shaped portion 66 is formed in an elongated shape with its long length direction running along the long length direction of the coupling webbing 18. Due to forming the projection shaped portion 66 to the second extension portion 62, as illustrated in FIG. 9, both end portions in the short length direction of the second extension portion 62 are formed with wire harness placement grooves 68 for disposing the wire harness 14 in. As illustrated in FIG. 10A to FIG. 10F, in the present exemplary embodiment, the wire harness 14 is disposed inside the wire harness placement groove 68 which is on the left side when the boot 20 is viewed from the side of the fixing plate 16 (see for example FIG. 1). Moreover, movement of the wire harness 14 in the width direction of the coupling webbing 18 is restricted by the wiring tube 26 of the wire harness 14 abutting the projection shaped portion 66. Note that in the present exemplary embodiment, the wire harness 14 is disposed inside the wire harness placement groove 68 which is on the left side; however, the wire harness 14 may be disposed inside the wire harness placement groove 68 which is on the right side depending on the position where the buckle device 10 is provided. In configuration including two of the wire harnesses 14, the two wire harnesses 14 may be respectively disposed in the left side wire harness placement groove 68 and in the right side wire harness placement groove 68.

As illustrated in FIG. 4, in the present exemplary embodiment, the buckle body 12 is fixed in a state inserted into one side end portion of the tube shaped portion 46. The buckle body 12 is inserted into the one side end portion of the tube shaped portion 46, and the buckle body 12 abuts one end portion 66A in the long length direction of the projection shaped portion 66, thereby restricting the insertion amount of the buckle body 12 into the tube shaped portion 46.

As illustrated in FIG. 4 and FIG. 7, an end portion on the first extension portion 60 side of the second extension portion 62 is configured by a gradually changing thickness portion 70, with a thickness that becomes gradually thinner on progression toward the first extension portion 60 side (on progression toward the buckle body 12 side), and that serves as a first bend origin portion and as a thickness thinned portion. The thickness of the gradually changing thickness portion 70 is set thinner than the thickness of a location of the second extension portion 62 that is further to the fixing plate 16 side than the gradually changing thickness portion 70. Accordingly, when the buckle body 12 is moved toward the side away from the vehicle seat (when the buckle body 12 is moved toward one side in the thickness direction of the coupling webbing 18), the boot 20 bends with the gradually changing thickness portion 70 acting as an origin portion of bending. Moreover, in the present exemplary embodiment, the gradually changing thickness portion 70 is disposed at the buckle body 12 side with respect to the depression 56 formed at the inner wall 50 of the boot 20 as viewed in cross-section from the side. Namely, the gradually changing thickness portion 70 and the depression 56 are disposed at different positions to each other in the long length direction of the coupling webbing 18. Note that in the present exemplary embodiment, the thickness of the first extension portion 60 is set with the same thickness as a minimum thickness portion of the gradually changing thickness portion 70.

As illustrated in FIG. 4 and FIG. 9, the extension portion 48 extends out from an end at the fixing plate 16 side of the inner wall 50 of the tube shaped portion 46 toward the fixing plate 16 side, and the extension portion 48 is formed with a U-shaped cross-section opening toward the side of the outer wall 52 of the tube shaped portion 46 as viewed from the fixing plate 16 side. At a boundary portion between the extension portion 48 and the inner wall 50 of the tube shaped portion 46, the engagement protrusion portion 72, serving as an engagement portion, projecting out toward the outer wall 52 side of the tube shaped portion 46, is provided. That is, at the inside the boot 20, the engagement protrusion portion 72 protrudes from an inner surface of the boot 20 toward the inside of the boot 20. Namely, the engagement protrusion portion 72 is provided so as to across the boundary between the extension portion 48 and the inner wall 50 of the tube shaped portion 46. The engagement protrusion portion 72 is fitted between the coupling webbing 18 that is inserted through the coupling webbing insertion hole 42 and the inner edge portion of the coupling webbing insertion hole 42 with a specific fit-interference, thereby suppressing rattling of the boot 20 with respect to the fixing plate 16. In other words, the coupling webbing 18 and the engagement protrusion portion 72 are inserted through (fitted in) the coupling webbing insertion hole 42 in a state in which the coupling webbing 18 and the engagement protrusion portion 72 are contacted with each other, and the coupling webbing 18 and the engagement protrusion portion 72 are abutted respective parts of the inner edge portion of the coupling webbing insertion hole 42. The extension portion 48 is formed with a clip insertion hole 74 through which the clip 38 is inserted. The clip 38 inserted through the clip insertion hole 74 is anchored to the clip anchor hole 40 formed at the fixing plate 16, thereby fixing the extension portion 48 of the boot 20 to the fixing plate 16, and suppressing the engagement protrusion portion 72 fitted between the coupling webbing 18 and the inner edge portion of the coupling webbing insertion hole 42 from coming out from the coupling webbing insertion hole 42.

Operation and Advantageous Effects of the Present Exemplary Embodiment

Next, explanation follows regarding operation and advantageous effects of the present exemplary embodiment.

As illustrated in FIG. 1, in the buckle device 10 of the present exemplary embodiment, the circular disk portion 30 of the fixing plate 16 is fixed to the seat cushion frame 200 of the vehicle seat, thereby fixing the buckle device 10 to the vehicle seat. The webbing 100 is worn across the occupant by retaining the tongue 110 through which the webbing 100 is inserted in the buckle body 12.

As illustrated in FIG. 4, in the present exemplary embodiment, the coupling webbing 18 is covered by the boot 20, and as illustrated in FIG. 10A to FIG. 10F, the boot 20 is provided with the projection shaped portion 66 that restricts movement of the wire harness 14 in the width direction of the coupling webbing 18. Movement of the wire harness 14 within the boot 20 can accordingly be restricted. Moreover, in this configuration, a process such as tape winding in order to restrict movement of the wire harness 14 within the boot 20 is not needed. Namely, in the buckle device 10 of the present exemplary embodiment, movement of the wire harness 14 that is connected to the buckle body 12 can be restricted without increasing number of assembly processes.

Moreover, in the present exemplary embodiment, the wire harness 14 can be disposed inside the boot 20 at the one side end portion or the another side end portion in the width direction of the coupling webbing 18. This thereby enables increased degrees of freedom of laying out the wire harness 14 inside the boot 20, while achieving a common boot 20 being used for different tapes of devices. Note that in the present exemplary embodiment, in a case in which the buckle device 10 is fixed to one width direction side of the vehicle seat, the wire harness 14 is disposed on the one side in the width direction of the coupling webbing 18 inside the boot 20, and in a case in which the buckle device 10 is fixed to another width direction side of the vehicle seat, the wire harness 14 is disposed on the another side in the width direction of the coupling webbing 18 inside the boot 20.

Moreover, as illustrated in FIG. 4, in the present exemplary embodiment, on insertion of the buckle body 12 into the tube shaped portion 46 of the boot 20, the buckle body 12 abuts the end portion 66A of the projection shaped portion 66, thereby restricting the insertion amount of the buckle body 12 into the boot 20. Namely, this completes insertion of the buckle body 12 into the boot 20. Employing this configuration enables greater workability during assembly of the buckle device 10.

In the present exemplary embodiment, the engagement protrusion portion 72 provided at the boot 20 is made to engage with the coupling webbing insertion hole 42 formed at the fixing plate 16, thereby enabling rattling of the boot 20 against the fixing plate 16 to be suppressed. Moreover, in this configuration, a process such as tape winding in order to suppress rattling of the boot 20 against the fixing plate 16 is not needed. Namely, according to the buckle device 10 of the present exemplary embodiment, rattling of the boot 20 against the fixing plate 16 can be suppressed without increasing number of assembly processes.

In the present exemplary embodiment, the engagement protrusion portion 72 provided at the boot 20 engages with the coupling webbing insertion hole 42 through which the coupling webbing 18 is inserted. This thereby enables the configuration of the fixing plate 16 to be simplified in comparison to a case in which the coupling webbing insertion hole 42 and an engaged-with portion that only engages with the engagement protrusion portion 72 of the boot 20 are provided at the fixing plate 16 independently of each other.

In the present exemplary embodiment, the engagement protrusion portion 72 is provided so as to across (straddle) the boundary between the extension portion 48, and the inner wall 50 of the tube shaped portion 46. Namely, part of the engagement protrusion portion 72 is provided at the extension portion 48 which extends out toward the outside of the tube shaped portion 46. This thereby enables good demolding characteristics of the boot 20 from the mold after pouring resin material, rubber material, or the like inside the mold and forming the boot 20.

Figure 12:
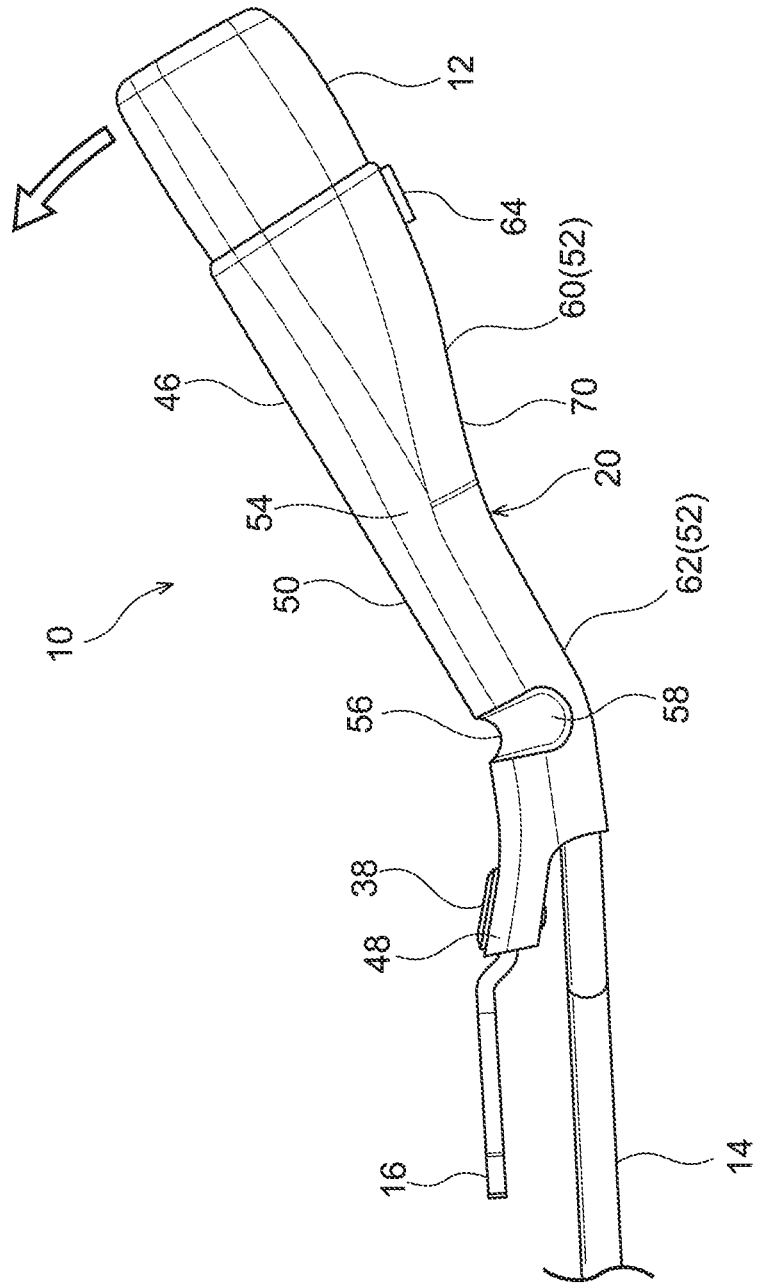
FIG. 12 is a side view schematically illustrating a state in which a boot has bent due to a buckle body moving toward a width direction inside of a vehicle seat.

In the present exemplary embodiment, as illustrated in FIG. 11, when the buckle body 12 is moved toward the side away from the vehicle seat, the boot 20 bends with the gradually changing thickness portion 70 acting as the bend-origin. As illustrated in FIG. 12, when the buckle body 12 is moved toward the side of the vehicle seat, the boot 20 bends with the depression 56 acting as the bend-origin. Note that in the present exemplary embodiment, the gradually changing thickness portion 70 and the depression 56 of the boot 20 are disposed at different positions to each other in the long length direction of the coupling webbing 18. Namely, the bend origin portion of the boot 20 when the buckle body 12 moves toward the side away from the vehicle seat, and the bend origin portion of the boot 20 when the buckle body 12 moves toward the side of the vehicle seat, does not coincide (are not at the same positions) in the long length direction of the coupling webbing 18. This thereby enables a lowering of the bending durability of the boot 20 to be suppressed.

In the present exemplary embodiment, the bend origin portion of the outer wall 52 of the tube shaped portion 46 of the boot 20, that can easily be seen by the occupant, is configured by the gradually changing thickness portion 70, thereby enabling a step, such as a depression, to be suppressed from being formed at this portion. Moreover, by making configuration such that the depression 56 is provided at the inner wall 50 of the boot 20 that is not easily seen by the occupant, the depression 56 can be suppressed from being seen by the occupant. Namely, the present exemplary embodiment enables detriment to the external design characteristics of the buckle device 10 to be suppressed. Moreover, the depression 56 can be further suppressed from being seen by the occupant due to providing the depression 56 to the end portion, which is on the fixing plate 16 side, of the inner wall 50. This thereby enables detriment to the external design characteristics of the buckle device 10 to be further suppressed.

In the present exemplary embodiment, explanation has been given regarding an example in which the gradually changing thickness portion 70 is formed at the outer wall 52 of the boot 20, and the depression 56 are provided at the inner wall 50; however, the present invention is not limited thereto. For example, at least one depression, hole, or thinned portion may be provided at the boot 20 at respective portions corresponding to the gradually changing thickness portion 70 and the depression 56 so as to configure bend origin portions at that portions.

Moreover, in the present exemplary embodiment, explanation has been given regarding an example in which part of the engagement protrusion portion 72 is provided at the extension portion 48 that extends out toward the outside of the tube shaped portion 46; however, the present invention is not limited thereto. For example, the entire engagement protrusion portion 72 may be provided at the extension portion 48 that extends out toward the outside of the tube shaped portion 46. Moreover, an engagement portion that engages with an engaged-with portion provided at the fixing plate 16 may be provided at a peripheral portion of the tube shaped portion 46.

In the present exemplary embodiment, explanation has been given regarding an example in which the engagement protrusion portion 72 provided at the boot 20 is made to engage with the coupling webbing insertion hole 42 through which the coupling webbing 18 is inserted; however, the present invention is not limited thereto. For example, the coupling webbing insertion hole 42 and an engaged-with portion that only engages with the engagement protrusion portion 72 of the boot 20 may be provided at the fixing plate 16 independently of each other.

In the present exemplary embodiment, explanation has been given regarding an example in which, on insertion of the buckle body 12 into the tube shaped portion 46 of the boot 20, the buckle body 12 abuts the end portion 66A of the projection shaped portion 66; however, the present invention is not limited thereto. For example, an abutted portion that is abutted by the buckle body 12 when the buckle body 12 is inserted into the tube shaped portion 46 of the boot 20, and does not include a function of restricting movement of the wire harness 14, may be provided inside the tube shaped portion 46 so as to restrict the insertion amount of the buckle body 12 into the boot 20. Moreover, configuration may be made in which a portion to restrict the insertion amount of the buckle body 12 into the boot 20 is not provided.

In the present exemplary embodiment, explanation has been given regarding an example in which the wire harness 14 can be disposed inside the boot 20 at the one side end portion or the another side end portion in the width direction of the coupling webbing 18 respectively; however, the present invention is not limited thereto. Whether or not to make configuration such that the wire harness 14 can be disposed inside the boot 20 at the one side end portion or the another side end portion in the width direction of the coupling webbing 18 respectively may be set as appropriate in consideration of the shape of the boot 20 and the like.

In the present exemplary embodiment, explanation has been given regarding an example in which the fixing plate 16 of the buckle device 10 is fixed to the seat cushion frame 200; however, the present exemplary embodiment is not limited thereto. For example, the fixing plate 16 of the buckle device 10 may also be fixed to the vehicle body 210.

Explanation has been given above regarding one exemplary embodiment of the present invention; however, the present invention is not limited to the above, and obviously various other modifications may be implemented within a range not departing from the spirit of the present invention.

What is claimed is:

1. A buckle device, comprising:
   a buckle body that retains a tongue through which a webbing worn across an occupant is inserted;
   a fixing portion that is fixed to a vehicle seat or a vehicle body and that includes an engaged portion;
   a coupling member that is formed in a belt shape and that couples the buckle body and the fixing portion; and
   a boot that covers the coupling member, and that includes an engagement portion that engages with the engaged portion so as to suppress rattling of the boot with respect to the fixing portion,
   wherein the engagement portion is integrally formed at the boot.

2. The buckle device of claim 1, wherein the engaged portion is configured as a coupling member insertion hole through which the coupling member is inserted.

3. A buckle device, comprising:
   a buckle body that retains a tongue through which a webbing worn across an occupant is inserted;
   a fixing portion that is fixed to a vehicle seat or a vehicle body and that includes an engaged portion;
   a coupling member that is formed in a belt shape and that couples the buckle body and the fixing portion; and
   a boot that covers the coupling member, and that includes an engagement portion that engages with the engaged portion so as to suppress rattling of the boot with respect to the fixing portion, wherein the engaged portion is configured as a coupling member insertion hole through which the coupling member is inserted, and
   wherein the engagement portion is a protruding portion that protrudes toward an inside of the boot, and the protruding portion and the coupling member are fitted in the coupling member insertion hole in a state in which the protruding portion, the coupling member insertion hole, and the coupling member are contacted.

4. A buckle device, comprising:
   a buckle body that retains a tongue through which a webbing worn across an occupant is inserted;
   a fixing portion that is fixed to a vehicle seat or a vehicle body and that includes an engaged portion;
   a coupling member that is formed in a belt shape and that couples the buckle body and the fixing portion; and
   a boot that covers the coupling member, and that includes an engagement portion that engages with the engaged portion so as to suppress rattling of the boot with respect to the fixing portion, wherein
   the boot comprises a tube portion formed in a tube shape that covers the coupling member, and an extension portion that extends from an open end of the tube portion; and
   at least a part of the engagement portion is provided at the extension portion.

5. The buckle device of claim 2, wherein:
   the boot comprises a tube portion formed in a tube shape that covers the coupling member, and an extension portion that extends from an open end of the tube portion; and
   at least a part of the engagement portion is provided at the extension portion.

6. The buckle device of claim 3, wherein:
   the boot comprises a tube portion formed in a tube shape that covers the coupling member, and an extension portion that extends from an open end of the tube portion; and
   at least a part of the engagement portion is provided at the extension portion.

7. The buckle device of claim 3, wherein the engagement portion is formed at the boot.

* * * * *